US009834914B2

(12) United States Patent  
Ben Jacov

(10) Patent No.: US 9,834,914 B2  
(45) Date of Patent: Dec. 5, 2017

(54) MODULAR PLUMBING PANEL AND METHOD OF INSTALLATION

(71) Applicant: Mordehay Yakir Ben Jacov, Oakland, CA (US)

(72) Inventor: Mordehay Yakir Ben Jacov, Oakland, CA (US)

(*) Notice: Subject to any disclaimer, the term of this patent is extended or adjusted under 35 U.S.C. 154(b) by 0 days.

(21) Appl. No.: 13/950,139

(22) Filed: Jul. 24, 2013

(65) Prior Publication Data

US 2015/0026946 A1  Jan. 29, 2015

(51) Int. Cl.
*E03C 1/02* (2006.01)
*E03C 1/122* (2006.01)
*F16L 5/10* (2006.01)

(52) U.S. Cl.
CPC ............ *E03C 1/1222* (2013.01); *E03C 1/021* (2013.01); *F16L 5/10* (2013.01); *Y10T 29/49826* (2015.01)

(58) Field of Classification Search
CPC ...... E03C 1/021; E03C 2001/028; F16L 3/22; F16L 3/221; F16L 3/222; F16L 3/223; F16L 3/2235; F16L 3/227; F16L 5/00; Y10T 29/49895; Y10T 29/49899; Y10T 29/49904; Y10T 29/49902
See application file for complete search history.

(56) References Cited

U.S. PATENT DOCUMENTS

| 2,295,888 A | * | 9/1942 | Bucknell et al. | 4/695 |
| 2,628,799 A | * | 2/1953 | Aaby | 248/57 |
| 2,661,483 A | * | 12/1953 | Tortorice | 4/695 |
| 2,773,708 A | * | 12/1956 | Beyerle | 285/64 |
| 2,824,312 A | * | 2/1958 | Tortorice | 4/695 |
| 2,997,058 A | * | 8/1961 | Hall | 137/360 |
| 3,009,167 A | * | 11/1961 | Leonard, Jr. | 4/695 |
| 3,021,103 A | * | 2/1962 | Beyerle | 248/57 |
| 3,404,858 A | * | 10/1968 | Levy | 248/68.1 |
| 3,611,451 A | * | 10/1971 | Armstrong | E03D 11/146 4/663 |
| 3,690,609 A | * | 9/1972 | Montesdioca | 248/68.1 |
| 4,550,451 A | * | 11/1985 | Hubbard | 4/695 |
| 4,564,249 A | * | 1/1986 | Logsdon | D06F 39/08 137/360 |
| 4,654,900 A | * | 4/1987 | McGhee | E03C 1/042 4/661 |
| 4,716,925 A | * | 1/1988 | Prather | D06F 39/08 137/270 |
| 4,817,348 A | * | 4/1989 | Wydra | 52/220.8 |
| 4,907,461 A | * | 3/1990 | Eto et al. | 73/862.322 |

(Continued)

FOREIGN PATENT DOCUMENTS

WO    WO 2006100670 A2 *  9/2006  ............ E03C 1/042

*Primary Examiner* — Ryan J Walters
*Assistant Examiner* — Lawrence Averick
(74) *Attorney, Agent, or Firm* — Larisa Migachyov

(57) ABSTRACT

A method of installing plumbing in a building, comprising the use of a plumbing support panel that enables outlet pipes and other plumbing pipes to be pre-assembled at the correct relative position with respect to each other for the installation of fixtures, and installed as a unit by mounting the panel to studs or to other parts of a building's structure. The panel comprises holes through which outlet pipes may be installed and mounting holes for the installation of pipe clamps to hold the pipes in place and for the mounting of the panel to a building's structure.

9 Claims, 5 Drawing Sheets

(56) References Cited

U.S. PATENT DOCUMENTS

| | | | |
|---|---|---|---|
| 4,907,766 A * | 3/1990 | Rinderer | 248/57 |
| 4,942,896 A * | 7/1990 | Slusser | E03C 1/01 137/360 |
| 5,050,824 A * | 9/1991 | Hubbard | 248/57 |
| 5,261,444 A * | 11/1993 | Childers | 137/360 |
| 5,359,820 A * | 11/1994 | McKay | D06F 39/08 220/477 |
| 5,423,345 A * | 6/1995 | Condon et al. | 137/360 |
| 5,469,882 A * | 11/1995 | Condon | 137/360 |
| 5,538,033 A * | 7/1996 | Condon | D06F 39/08 137/360 |
| 5,577,530 A * | 11/1996 | Condon | 137/360 |
| 5,653,254 A * | 8/1997 | Condon | E03C 1/021 137/360 |
| 5,755,247 A * | 5/1998 | Condon | 137/15.17 |
| 5,803,508 A * | 9/1998 | Lowella | 285/64 |
| 6,035,886 A * | 3/2000 | Kerr | F16L 5/14 137/360 |
| 6,125,881 A * | 10/2000 | Hobbs | D06F 39/08 137/360 |
| 6,129,109 A * | 10/2000 | Humber | D06F 39/08 137/360 |
| 6,148,850 A * | 11/2000 | Kopp | D06F 39/08 137/356 |
| 6,155,286 A * | 12/2000 | Geary | D06F 39/08 137/269 |
| 6,158,066 A * | 12/2000 | Brown et al. | 4/695 |
| 6,234,193 B1 * | 5/2001 | Hobbs | D06F 39/08 137/360 |
| 6,845,785 B1 * | 1/2005 | Condon | E03C 1/021 137/312 |
| 7,014,152 B2 * | 3/2006 | Grendahl | 248/49 |
| 7,039,965 B1 * | 5/2006 | Ismert | 4/695 |
| 7,131,792 B2 * | 11/2006 | Doverspike | 405/184.4 |
| 7,204,267 B1 * | 4/2007 | Persico | 137/360 |
| 7,357,148 B1 * | 4/2008 | Gibson | E03C 1/021 137/360 |
| 7,360,553 B1 * | 4/2008 | Ismert | F16L 5/10 137/360 |
| 7,735,511 B1 * | 6/2010 | Ismert | F16L 5/10 137/360 |
| 7,926,765 B1 * | 4/2011 | Brown et al. | 248/57 |
| 8,226,051 B2 * | 7/2012 | Brown et al. | 248/68.1 |
| 9,057,460 B2 * | 6/2015 | Ismert | F16L 5/10 |
| 2005/0067017 A1 * | 3/2005 | Condon | E03C 1/021 137/360 |
| 2005/0244230 A1 * | 11/2005 | Doverspike | 405/184.4 |
| 2010/0000614 A1 * | 1/2010 | Zahuranec | E03C 1/021 137/360 |
| 2012/0273064 A1 * | 11/2012 | Ismert | F16L 5/10 137/360 |
| 2015/0204461 A1 * | 7/2015 | Ben Jacov | F16L 3/123 138/106 |
| 2015/0225931 A1 * | 8/2015 | Zahuranec | E03C 1/021 137/360 |
| 2015/0259891 A1 * | 9/2015 | Ismert | E03C 1/12 137/360 |

\* cited by examiner

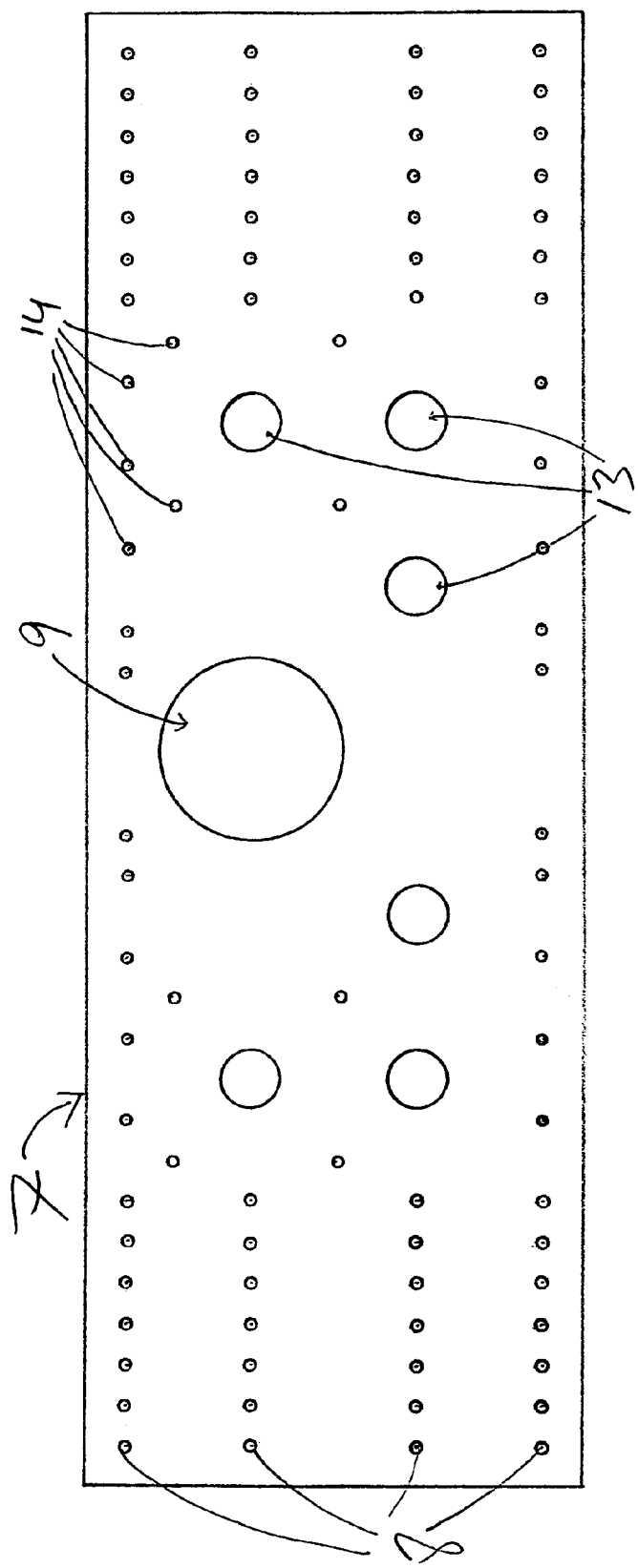

MODULAR PLUMBING PANEL AND METHOD OF INSTALLATION

CROSS-REFERENCE TO RELATED APPLICATIONS

The present application is a divisional application of application Ser. No. 13/136,317, now abandoned, filed Jul. 29, 2011 which claims the benefit of Provisional App. No. 61/517,283, filed Apr. 18, 2011, which is hereby incorporated by reference in its entirety.

BACKGROUND OF THE INVENTION

Field of the Invention

The present invention relates to plumbing fixtures, in particular to preassembled plumbing fixtures.

Description of the Prior Art

The installation of plumbing systems such as kitchen or bathroom sinks, toilets, or other plumbing fixtures and appliance outlets for residential, commercial, or industrial applications, typically requires the use of devices such as holders and straps to hold incoming and outgoing pipes to and from the plumbing fixture or appliance outlet. Typically, the way that plumbing systems are installed is by securing the plumbing pipes to the structure of the building (except in the case of underground plumbing, which is supported by the earth). The pipes are usually secured to the structure by straps and brackets. Temporary "rough-in" brackets may also be used during installation.

Some plumbing fixtures, such as sinks or toilets, have standard dimensions and standard distances between the pipes. For example, the distance between the hot and cold water pipes in a bathroom sink is always the same. A plumber installing a sink would therefore need to install the pipes leading up to the sink in such a way that the two outlet pipes come out of the wall at the predetermined distance necessary for a sink. This can be difficult, since the two pipes need to be soldered in place, existing brackets typically only hold one pipe at a time, and ensuring that the two pipes are at the exact distance needed for a sink is a time-consuming and laborious task. Many pipe locators, clamps, support straps, and other similar devices have been developed to make this job easier; however, all of them still require the plumber to install the outlet pipes on location while the pipes are temporarily held in place by whatever fixture is used. Since plumbers typically charge by the hour, this is an expensive proposition.

A need therefore exists for a device and method that would enable standard plumbing systems such as sink or toilet outlets to be pre-assembled offsite and installed as a unit.

SUMMARY OF THE INVENTION

An object of the present invention is to provide a system and method for pre-assembling outlet pipes in a way that will place them in the correct position relative to each other for the installation of a plumbing fixture.

Another object of the present invention is to provide a system and method for mounting a group of outlet pipes as a single unit in such a way that will place them in the correct position relative to each other for the installation of a plumbing fixture, and that will render it easy to connect the outlet pipes to a plumbing system.

Another object of the present invention is to provide a system and method for the installation of plumbing pipes that enables the assembly of outlet pipes to be done at a remote location.

Another object of the present invention is to provide a plumbing support panel to which outlet pipes may be rigidly mounted, said plumbing support panel being mountable as a unit to a building's structure.

In accordance with the foregoing objects and advantages, the present invention provides a plumbing support panel, said panel comprising one or more holes through which outlet pipes may be rigidly secured. The holes are placed in the correct relative positions for the installation of a plumbing fixture such as a sink or a toilet. Multiple sets of holes may also be present, to enable the installation of different fixtures using identical panels. The holes may be round or may be shaped like elongated slots. The holes may be indented for the installation of grommets. The panel may also comprise holes for the fastening of pipe clamps, so that an outlet pipe can be connected to a section of pipe and that the section of pipe can be rigidly secured to the panel. The plumbing support panel also comprises mounting holes, flanges, or other attachment features that enable it to be mounted to a stud or to another part of a building's structure.

The assembly method of the present invention comprises assembling outlet pipes to the holes in the plumbing support panel in such a way that the outlet pipes are correctly positioned with respect to each other for the installation of a plumbing fixture; installing the plumbing support panel on a building structure; and connecting the outlet pipes to a building's plumbing system.

BRIEF DESCRIPTION OF THE DRAWINGS

FIG. 2 shows an embodiment of the panel of the present invention.

DETAILED DESCRIPTION OF THE PREFERRED EMBODIMENT

Figure 1:
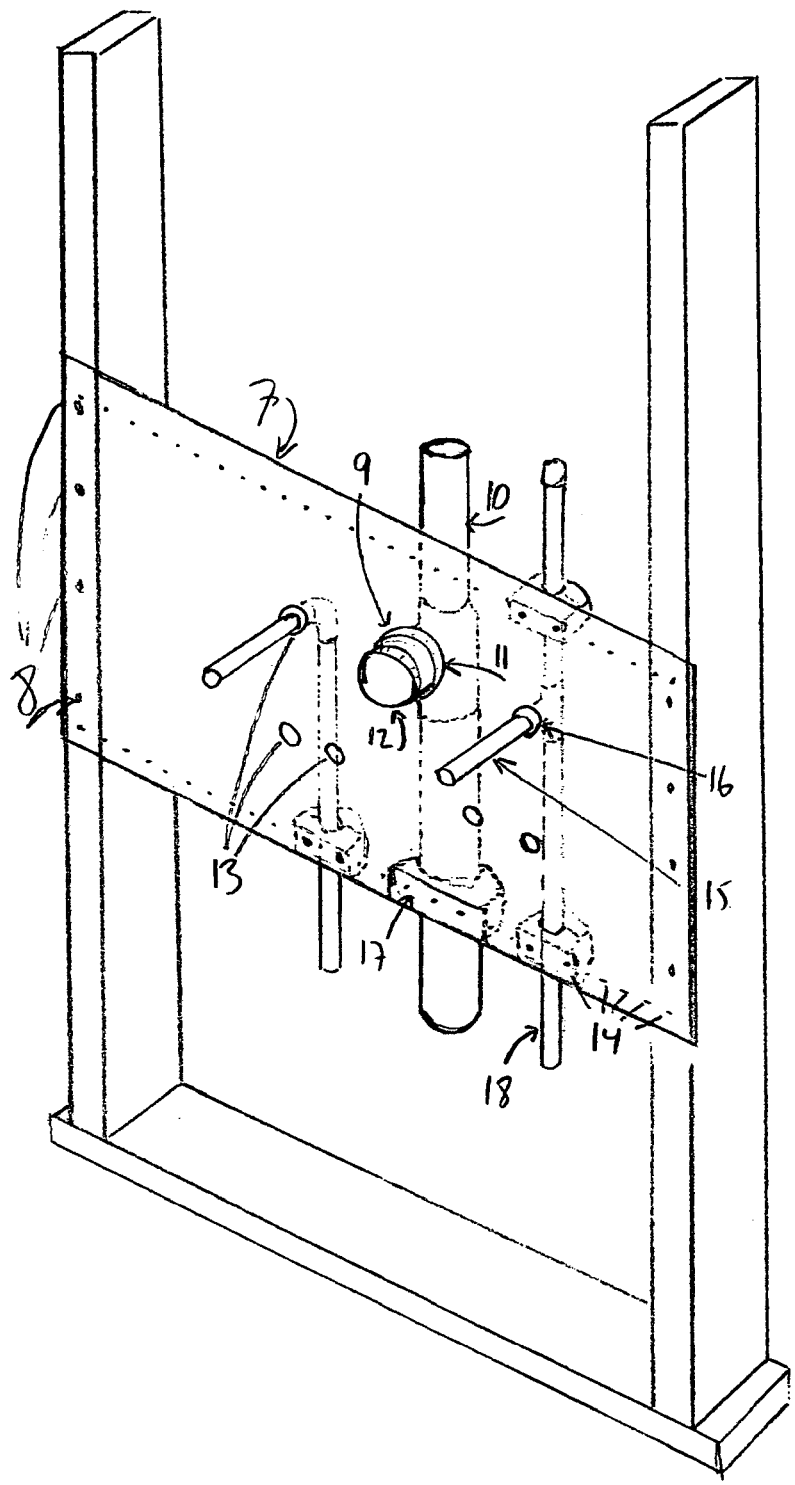
FIG. 1 shows an embodiment of the panel of the present invention designed for the installation of a sink, installed in position with pipes assembled to it.

FIG. 1 shows a front view of the panel of the present invention, in the embodiment designed for the installation of a sink. Panel 7 is mounted to two studs using mounting holes 8. The panel comprises a drainpipe hole 9 for the drainpipe outlet of a sink and water pipe holes 13 placed at preset locations in such a way as to place them at standard distances from each other and from the drainpipe hole 9 for the installation of a sink. The panel can have any number of holes, depending on how many possible standard distances there are for sink installation, and the holes can be placed at any locations that are required by the plumbing fixture in question. For example, some pedestal sinks require the water pipe outlets to be 4" from the center of the drainpipe, while a kitchen sink may require a water pipe outlet that is 8" from the center, and possibly two hot water outlets and one cold. The panel can be made for one particular type of fixture, or can comprise holes that make it possible to install several different types of fixtures.

Pipe clamp mounting holes 14 are located on the lower and upper edges of the panel. This makes it possible to mount the pipe sections to the panel. The pipe clamp mounting holes are aligned with the drainpipe or water pipe holes in such a way as to enable the pipe to be clamped to the panel while the outlet goes through the hole.

A prefabricated section of drainpipe 10 is mounted to the back of the panel with a pipe clamp bracket 17. Prefabricated sections of copper water pipe 18, soldered together with an air chamber on one side (cold) and a ninety-degree elbow on the other side (hot), are mounted on the panel with pipe clamp brackets using the pipe clamp mounting holes 14.

In the preferred embodiment of the method of the present invention, the assembly of the prefabricated pipe sections to the panel can be done offsite and brought on site as a unit. The plumber can then install the panel in position by using screws to attach it to the wall studs through the mounting holes 8, or by attaching it to other parts of the building structure. The prefabricated pipe sections can then be connected to the rest of the building's plumbing, and the outlets can be connected to the sink (or other fixture). Since the outlets are preassembled and guaranteed to be in the correct position for the fixture being installed due to the panel's dimensions, installation is greatly simplified.

In the preferred embodiment of the present invention, the pipes are attached to the panel in a removable manner, by nuts or simply by compression fit. This simplifies assembly and allows for post-assembly adjustments if necessary.

FIG. 2 shows a detailed view of the panel in its embodiment designed for a sink. The water pipe holes 13 are placed at the following distances from the drainpipe hole 9—two water pipe holes are set at 8" away from the center of the drainpipe hole, and two water pipe holes are set at 8" and 4" from the center of the drainpipe hole, to accommodate two of the most common sink installation standards. The mounting holes 8 are located at the edges of the panel in such a way as to make it possible to attach the panel to two adjacent studs in a standard stud wall—typically the studs are 16" apart. Pipe clamp mounting holes 14 are located in such a way as to make it possible to clamp the pipes to the panel.

Figure 3:
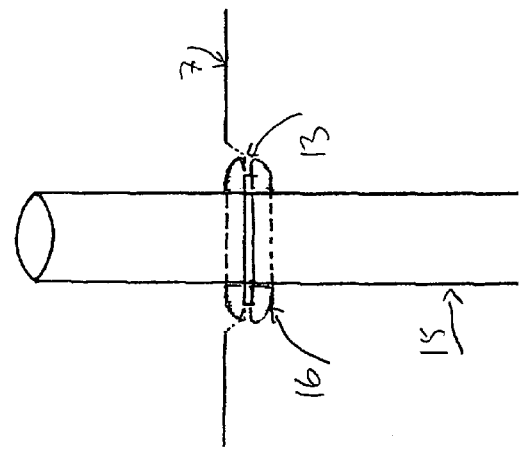
FIG. 3 shows a side view of an outlet pipe hole in the panel of the present invention.

FIG. 3 shows a side view of an embodiment of the outlet hole in the panel. Water pipe 15 passes through the outlet hole 13 in panel 7. The panel 7 is slightly indented around the outlet hole 13, and a rubber grommet 16 is placed around the hole. The indentation in the panel is approximately equal to the thickness of the rubber grommet; this enables the outer surface of the panel to be flat.

Figure 4:
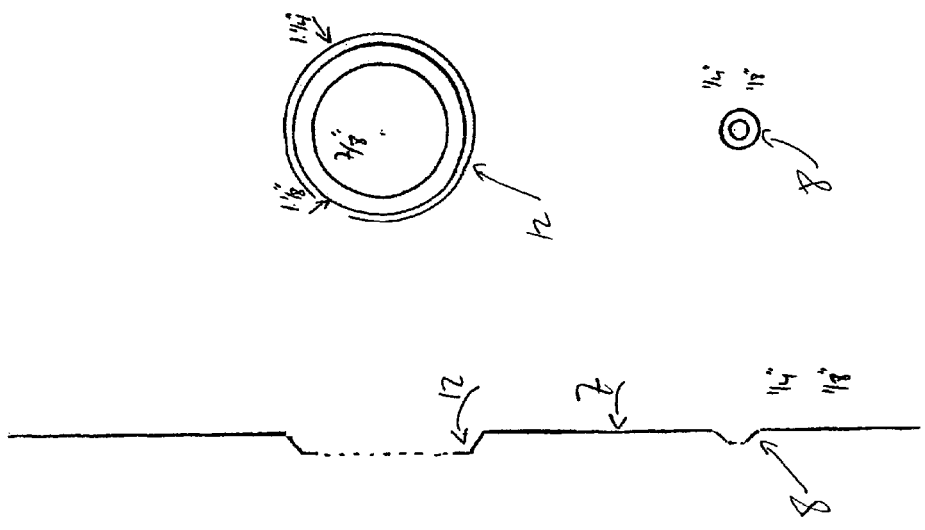
FIG. 4 shows a side and front view of a pipe hole and a pipe clamp mounting hole in the panel of the present invention.

FIG. 4 shows a side view and a front view of two holes in one embodiment of the panel 7. Drain pipe outlet hole 9 has an indentation to house a rubber grommet, similarly to the one shown in FIG. 3. Pipe clamp bracket mounting hole 14 is indented to accommodate a screw head. The indentations are designed to make sure that the outer surface of the panel is flat for a finish wall.

Figure 5:
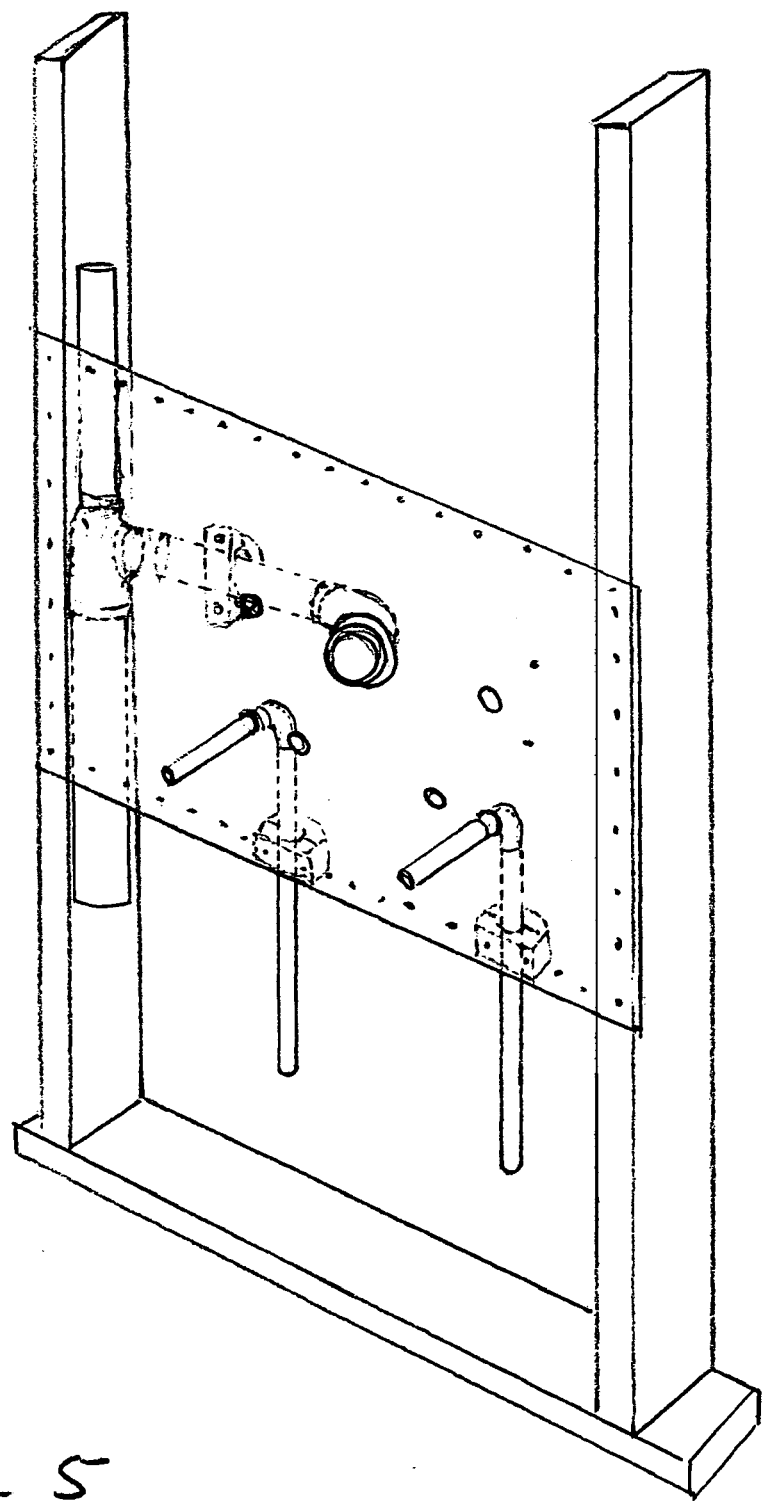
FIG. 5 shows an alternate embodiment of the panel of the present invention designed for the installation of a sink, installed in position with pipes assembled to it.

FIG. 5 shows a front view of the panel installed on two studs with a sink drain pipe and two water pipes installed, in an embodiment where the drain outlet is extended sideways. As can be seen from the Figure, the panel can be configured in any way necessary for the installation of the given pipes.

Figure 6:
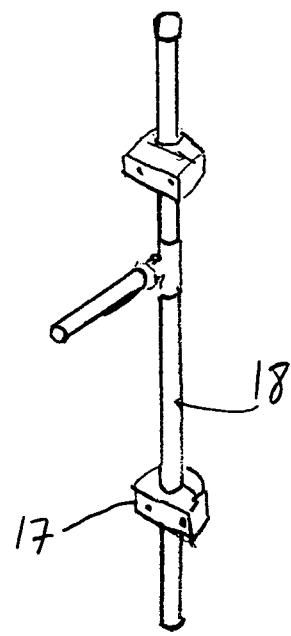
FIG. 6 shows a pipe assembly ready to be mounted to the panel of the present invention.

FIG. 6 shows a pre-fabricated section of a water pipe such as may be installed on the panel of the present invention. A tee-joint connects two sections of pipe 18 and an outlet pipe. Pipe clamp brackets 17 are installed onto the vertical pipe sections. The pipe assembly is then ready to be assembled to the panel.

While the embodiment described above pertains to the installation of a sink, it is easy for a person skilled in the art to understand that the invention is equally applicable to the installation of any other plumbing fixture, or to any other plumbing installation where the relative position of outlet pipes is important.

The invention claimed is:

1. A method of installing plumbing pipes in a building, comprising:
   assembling at least one outlet pipe and a plumbing support panel, said outlet pipe being rigidly attached to the plumbing support panel through at least one hole in the plumbing support panel with at least one fastener and said outlet pipe being rigidly attached to the plumbing support panel in a second position distinct from the at least one hole with at least one second fastener,
   said at least one hole being positioned in such a way as to put the outlet pipe or pipes in a correct position for the installation of a plumbing fixture,
   wherein both the at least one fastener and the at least one second fastener are removable and reattachable,
   wherein the assembling step happens at a first location;
   transporting the assembly of the at least one outlet pipe and the plumbing support panel from the first location to a second location;
   after the assembling step is completed,
   mounting the assembly of the at least one outlet pipe and plumbing support panel onto a building structure by attaching the plumbing support panel to the building structure in such a way that the plumbing support panel is parallel to the wall of the building,
   wherein the mounting step happens at the second location.

2. The method of claim 1, further comprising:
   installing a plumbing fixture onto the at least one outlet pipe.

3. The method of claim 2, where the assembling step comprises rigidly attaching one drain outlet pipe and two water outlet pipes to the plumbing support panel in such a way that a sink may be connected to the one drain outlet pipe and the two water outlet pipes, and where the plumbing fixture is a sink.

4. The method of claim 1, where the assembling step also comprises:
   assembling at least one pipe section to at least one outlet pipe at a 90 degree angle;
   mounting the at least one pipe section to the plumbing support panel by at least one pipe clamp.

5. The method of claim 1, where the mounting step comprises attaching the plumbing support panel to at least one stud by at least one screw.

6. The method of claim 1, where the assembly step comprises removably attaching at least one outlet pipe to the plumbing support panel by one of the following: at least one nut, or compression fit.

7. The method of claim 1,
   where the plumbing support panel comprises a plurality of fixture hole sets,
   each fixture hole set comprising a plurality of holes located at the right relative locations for the installation of a plumbing fixture,
   further comprising, prior to the assembling step:

selecting the correct fixture hole set for the installation of outlet pipes depending on which plumbing fixture is being installed.

8. The method of claim 1, wherein the at least one fastener is a rubber grommet.

9. The method of claim 1, further comprising:
after the transporting step and prior to the mounting step, at the second location, removing at least one outlet pipe from the plumbing support panel;
reattaching the at least one outlet pipe to the plumbing support panel.

\* \* \* \* \*